(12) United States Patent
Taguchi et al.

(10) Patent No.: US 8,908,913 B2
(45) Date of Patent: Dec. 9, 2014

(54) VOTING-BASED POSE ESTIMATION FOR 3D SENSORS

(75) Inventors: Yuichi Taguchi, Cambridge, MA (US); Oncel Tuzel, Cambridge, MA (US); Srikumar Ramalingam, Cambridge, MA (US); Changhyun Choi, Atlanta, GA (US); Ming-Yu Liu, College Park, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 87 days.

(21) Appl. No.: 13/329,493

(22) Filed: Dec. 19, 2011

(65) Prior Publication Data

US 2013/0156262 A1 Jun. 20, 2013

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS 7,366,645 B2 * 4/2008 Ben-Arie et al. ................ 703/6
7,822,264 B2 * 10/2010 Balslev et al. ................ 382/154
8,467,596 B2 * 6/2013 Abadpour et al. ............ 382/151
8,558,883 B2 * 10/2013 Cavallaro et al. ............. 348/135
2007/0070069 A1 * 3/2007 Samarasekera et al. ...... 345/427
2007/0127816 A1 * 6/2007 Balslev et al. ................ 382/181
2008/0013836 A1 * 1/2008 Nakamura et al. ............ 382/209
2012/0185095 A1 * 7/2012 Rosenstein et al. ........... 700/259
2013/0093852 A1 * 4/2013 Ye .................................. 348/46

FOREIGN PATENT DOCUMENTS

DK 2005017820 A1 2/2005

OTHER PUBLICATIONS

Bertram Drost et al. "Model Globally Match Locally: Efficient and Robust 3D Object Recognition," 2010 IEEE Conference on Computer Vision and Pattern Recognition (CVPR), Jun. 13-18, 2010, San Francisco, CA, USA. IEEE, Piscataway, NJ, US. Jun. 13, 2010. p. 998-1005.

Changhyun Choi et al. "Voting-based pose estimation for robotic assembly using a 3D sensor," Robotics and Automation (ICRA), 2012 IEEE International Conference on, IEEE, May 14, 2012, pp. 1724-1731.

\* cited by examiner

*Primary Examiner* — Nancy Bitar
(74) *Attorney, Agent, or Firm* — Dirk Brinkman; Gene Vinokur

(57) ABSTRACT

A pose of an object is estimated by first defining a set of pair features as pairs of geometric primitives, wherein the geometric primitives include oriented surface points, oriented boundary points, and boundary line segments. Model pair features are determined based on the set of pair features for a model of the object. Scene pair features are determined based on the set of pair features from data acquired by a 3D sensor, and then the model pair features are matched with the scene pair features to estimate the pose of the object.

12 Claims, 8 Drawing Sheets

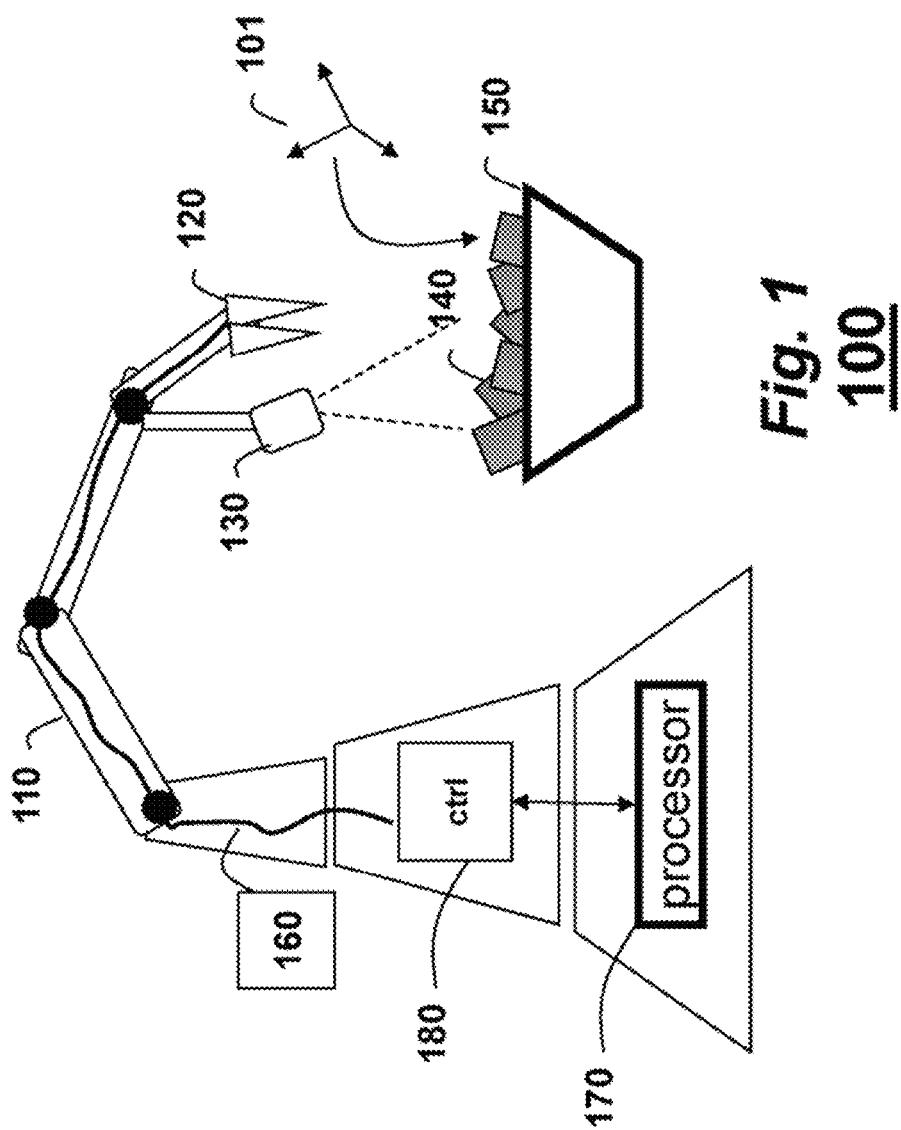

200

200

VOTING-BASED POSE ESTIMATION FOR 3D SENSORS

FIELD OF THE INVENTION

This invention relates generally to estimating poses of 3D objects, and more particularly to estimating poses from data acquired by 3D sensors.

BACKGROUND OF THE INVENTION

The pose of an object has 6-degree-of-freedom (6-DoF), i.e., 3D translation and 3D rotation. The problem of pose estimation refers to finding the pose of an object with respect to a reference coordinate system, usually the coordinate system of a sensor. The pose can be acquired using measurements from sensors, e.g., 2D images, 3D point clouds, with 3D models. Pose estimation plays a major role in many robotics applications such as bin picking, grasping, localization, autonomous navigation, and 3D reconstruction.

Until recently, pose estimation was primarily done using 2D images because cameras are cost effective and allow fast image acquisition. The main problem with 2D images is to match the 2D features with their corresponding 3D features in the model. This becomes challenging due to various illumination conditions and different viewpoints of the camera, causing changes in rotation and scale in the image space. Furthermore, some views of the object can theoretically lead to ambiguous poses. Several invariant feature descriptors are known to determine the correspondences between an input image and a database of images, where the 2D keypoints are matched with the 3D coordinates.

Many industrial parts are textureless, e.g., machined metal parts or molded plastic parts. Therefore, one has to rely heavily on observable edges in the images. When boundaries of an object are used, a set of edge templates of an object is often known a priori, and the templates are searched in query edge maps. Several variants that incorporate edge orientation or hierarchical representation are known. Intensity-based edge detection often yields too many edge pixels where only a few are useful edges coming from depth discontinuities. A multi-flash camera can be used to directly estimate depth edges by casting shadows from multiple flash directions.

Generally, 3D data obtained with 3D sensors have a lot less variants in contrast to 2D data. The main challenge is to solve the correspondence problem in the presence of sensor noise, occlusions, and clutter. The correspondence problem refers to finding a one-to-one matching between features in the data and features in the model. The features are usually constructed to characterize the size and shape of the object. Several 3D feature descriptors, using the distributions of surface points and normals, and matching procedures are known. Those descriptors are generally invariant to rigid body transformation, but sensitive to noise and occlusion. Furthermore, those features require dense point clouds, which may not be available.

Pose estimation is feasible with various kinds of correspondences between sensor 3D data and the model: 3 point correspondences, 2 line correspondences, and 6 points to 3 or more planes. Typically those correspondences are used in a hypothesize-and-test framework such as RANdom SAmple Consensus (RANSAC) to determine the pose. Alternatively, the pose can be retrieved from the mode of the hypothesized pose distribution either using a Hough voting scheme, or clustering in the parameter space. Those approaches suffer from two problems when only 3D sensor data are available without images or other prior information. Points, lines, and planes are not very discriminative individually and are combinatorial to match, and it is difficult to achieve fast computation without doing any prior processing on the model.

A pair feature can be defined by a distance and relative orientations between two oriented points on the surface of an object. An object is represented by a set of oriented point pair features, which is stored in a hash table $\mathcal{H}$ for fast retrieval. Random two points are sampled from the sensor data and each such pair votes for a particular pose. The required pose corresponds to the one with a largest number of votes. A simpler pair feature consisting of the depth difference between a pixel and an offset pixel is used for human pose estimation with a random forest ensemble classifier.

SUMMARY OF THE INVENTION

The embodiments of the invention provide a voting-based method for estimating a pose of an object from data acquired by a 3D sensor. Although oriented surface points (points on the surface of an object with normals) used in the prior art are discriminative for objects with significant curvature changes, those surface points are not compact and discriminative enough for many industrial and real-world objects, which are planar.

To obtain information from boundaries, edges play a key role in 2D registration, while depth discontinuities are crucial in 3D. The embodiments provide a family of pose estimation methods that better exploit this boundary information. In addition to oriented surface points, we use two other geometric primitives, including oriented boundary points (points on the boundaries of an object with directions) and boundary line segments.

Carefully selected primitives encode more information compactly and thereby provide a greater accuracy for a wide class of industrial parts and enable faster computation.

BRIEF DESCRIPTION OF THE DRAWINGS

FIG. 1 is a schematic of a robotic assembly apparatus that can use the embodiments of the invention;

DETAILED DESCRIPTION OF THE PREFERRED EMBODIMENT

Figure 2A:
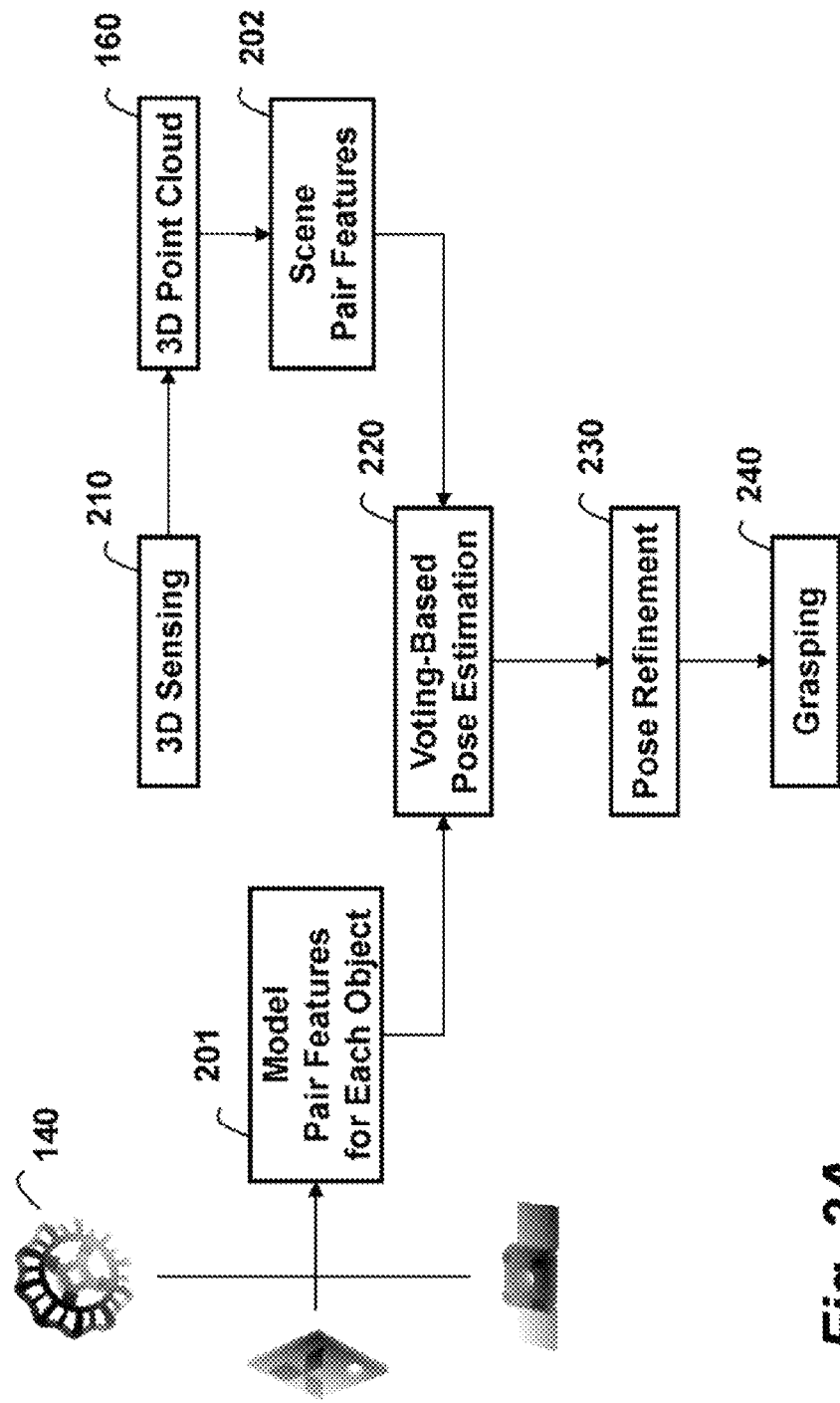
FIG. 2A is a block diagram of a method for determining a pose of a 3D object using a voting-based method according to embodiments of the invention.

FIG. 1 shows a system 100 for estimating a pose of an object. The system includes a 6-axis robotic arm 110 with a gripper 120. A 3D sensor 130 is arranged on the arm. The gripper picks objects 140 up from a bin 150 depending on their pose 101. It should be noted that the bin can contain different objects.

One example 3D sensor uses structured light generated by an infrared laser. Other sensors are also possible. The sensor acquires 3D "point clouds" 160 as depth maps of 640×480 pixels. The 3D sensor is calibrated with respect to the robot arm, thereby allowing grasping and picking of an object using the pose.

The 3D point clouds are processed by a method performed in a processor 170. The processor can include memory and input/output interfaces as known in the art. The method determines the pose, which can be fed back to a controller 180 to direct the arm to pick the object 140.

FIG. 2A shows a block diagram of the method 200, which includes the following steps: 3D sensing 210 of the scene, voting-based pose estimation 220, pose refinement 230, and grasping 240 of the object according to its pose.

The system scans the bin of objects using the 3D sensor to detect an object and picks it up according to the pose determined by the method. Given a 3D CAD model of each different object in the bin, the voting-based method performs detection and pose estimation of the object using a scanned 3D point cloud 160. This step provides multiple coarse poses. The system selects several best coarse poses and individually refines the poses using an iterative-closest point (ICP) procedure.

Generally, the ICP minimizes a difference between two 3D point clouds. The ICP is often used to reconstruct a complete 3D model from multiple partial scans acquired at different locations and to localize robots with respect to a 3D environmental model. The procedure can be performed in real time by iteratively revising the transformation (translation and rotation) needed to minimize the distance between the corresponding points. The input is the two 3D point clouds, an initial estimate of the transformation, and a termination criterion. The output is the refined transformation. The primary steps include finding corresponding points by a nearest neighbor criterion, estimating transformation parameters using a mean squared error as a cost function, transforming the points using the estimated parameters, and iterating.

The ICP procedure in our system renders the CAD model of the object using the current pose estimate and generates a 3D point cloud for the model by sampling the surface of the rendered model. Then, the ICP determines the closest 3D point in the scanned point cloud for each 3D point in the model and updates the pose estimate using the 3D point correspondences.

After the ICP converges, a registration error is measured as an average distance between the corresponding 3D points in the scanned point cloud and the model. The registration error can be high when the ICP converges to an incorrect pose, or when a part of the object is missing due to occlusion from other objects. Therefore, if the registration error is high, our system does not use the estimated pose for grasping. In addition to the registration error, our system also checks whether the object at the pose is reachable by the robot arm to determine whether the object can be picked up.

Coordinate Systems

For the purpose of this description, three coordinate systems are used. The sensor is expressed in terms of a sensor (camera) coordinate system C. The model of the object is expressed in terms of an object coordinate system O. The object in the scene uses a world coordinate system W. The sensor coordinate system S can be calibrated to the world coordinate system W because, in general, the sensor is at a known location and orientations in the real world.

The pose estimation method determines a transformation between the sensor coordinate system and the object coordinate system. Then, relationship between the sensor and world coordinate systems can be used to manipulate the object in the scene.

Voting-Based Pose Estimation

Our features for pose estimation are based on pairs of oriented points or lines, which we refer to as pair features. A pair feature consisting of a pair of oriented surface points is denoted by S2S, because we construct the feature vector asymmetrically from one oriented point (reference) to another (referred). Similarly, we have four other pair features based on a pair of oriented boundary points (B2B), a pair of line segments (L2L), and a heterogenous pair including an oriented surface point and an oriented boundary point (S2B and B2S), see FIGS. 3A-3C.

Figure 3A:
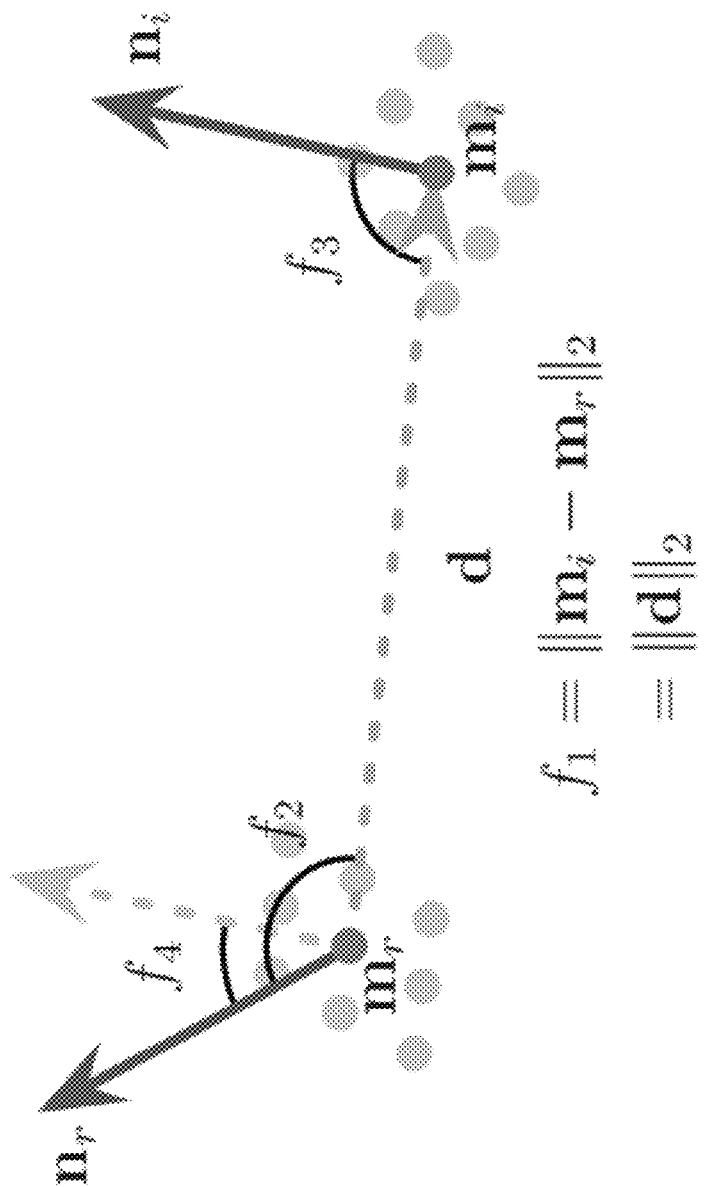
FIGS. 3A-3D are schematics of pair features for voting-based pose estimation according to embodiments of the invention.

Point pair feature descriptors, $F_{S2S}$, $F_{B2B}$, $F_{S2B}$, and $F_{B2S}$, are defined by the relative position $f_1$ and orientations $f_2, f_3$, and $f_4$ of a pair of oriented points (m, n), where points indicate either surface points with surface normals, or boundary points with directions. In FIG. 3D the line pair feature descriptor $F_{L2L}$ is defined by the minimum distance between two infinite lines $f_1$, the acute angle between two line directions $f_2$, and the maximum distance between the two line segments $f_3$.

To estimate the pose of the object, it is necessary to establish correspondences between pair features as obtained from the scene and the model. We use various geometric constraints from the pair feature as its descriptor. Then, the correspondences between the scene and model pair features are established by matching their descriptors.

Pair Features

S2S—Surface Pair Feature:

A surface pair feature S2S is defined using two points on the object surface and their normals. Given an oriented point from the scene and a corresponding primitive from the model, the 3D pose can be recovered up to a planar rotation by aligning point locations and their normals. To resolve the rotation ambiguity and recover the full 6-DoF pose, at least correspondences between two pairs of scene and model primitives are necessary.

Let $\{(m_r, n_r), (m_i, n_i)\}$ denote the pair feature where $m_r$ and $m_i$ are the reference and referred points on the object surface, and $n_r$ and $n_i$ are the corresponding normals, respectively. The associated descriptor with this pair feature is $$F_{S2S} = (f_1, f_2, f_3, f_4)^T \quad (1)$$

$$= (\|d\|_2, \angle(n_r, d), \angle(n_i, d), \angle(n_r, n_i))^T \quad (2)$$

where d is the vector from the reference point to the referred point, and $\angle(v_1, v_2) \in [0, \pi)$ represents the angle between two vectors.

Thus, the first component of the descriptor represents $f_1 = \|m_i - m_r\|_2 = \|d\|_2$, which is the Euclidean distance between the two surface points. The second and third components $f_2$ and $f_3$ are angles between the vector d and the surface normal vectors $n_r$ and $n_i$, respectively. The last component $f_4$ is the angle between the two normal vectors. The S2S feature is shown in FIG. 3A. If the object spans a wide range of normals, then this feature provides a good description of the object.

B2B—Boundary Pair Feature:

The S2S feature fails to provide a good description for shapes that do not span a wide range of surface normals. Unfortunately, many industrial parts used during robotic assembly are planar and have a very small set of normal directions. Additionally, due to noise in the 3D data, it is difficult to estimate the normals accurately in high curvature regions on the surface, which further complicates the problem.

We define a novel point pair feature B2B based on two points on object boundaries. In contrast to surface points, boundary points do not have well defined normals. For boundary points, we fit line segments and use the directions of the line segments for orientations. To extract the line segments on object boundaries, we first determine the edges in the depth map using a Canny edge detector. The edges are stored in an edge map. Points from the edge map are randomly sampled and 3D lines are fit on local regions centered around these points using a RANSAC procedure. By iteratively locating and removing line segments with maximum inliers, we recover all the line segments. These line segments are further refined by applying least squares to the inliers. After line fitting, we uniformly sample boundary points on the 3D line segments.

Figure 3B:
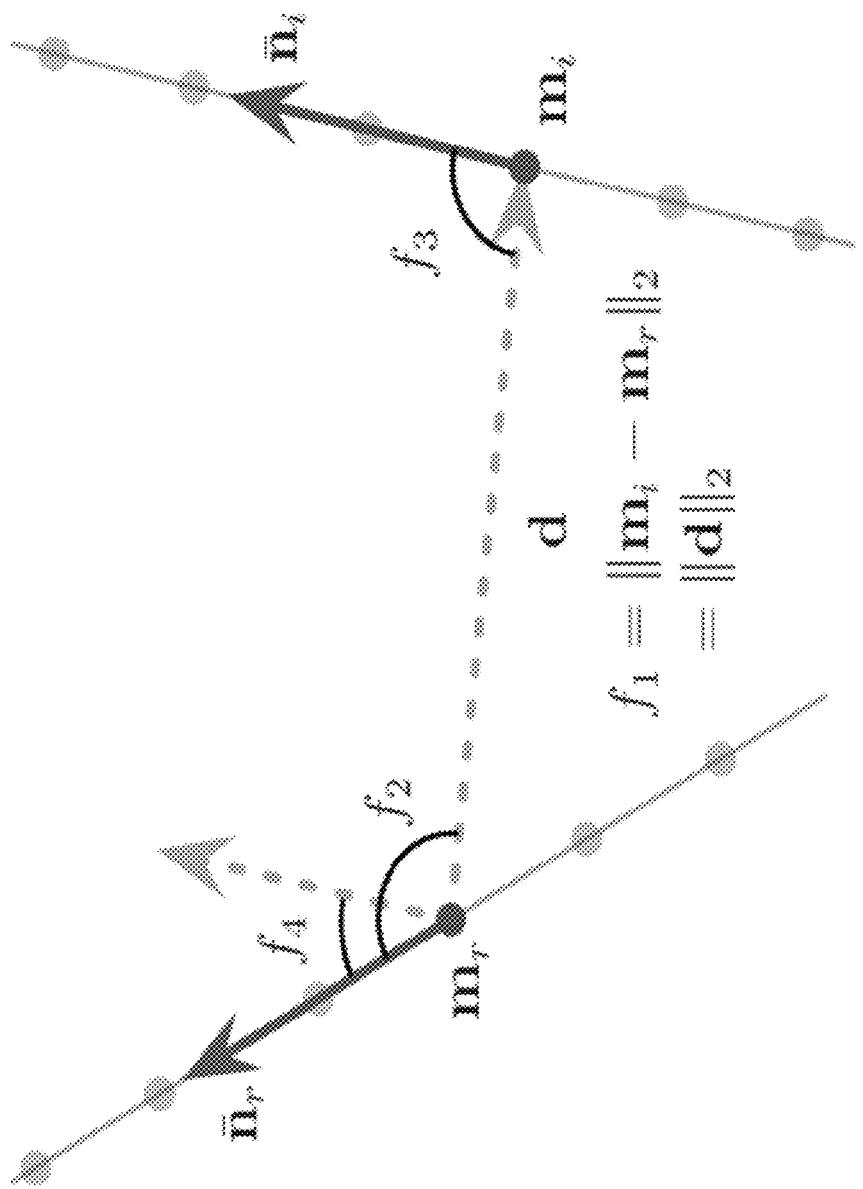
Figure 3C:
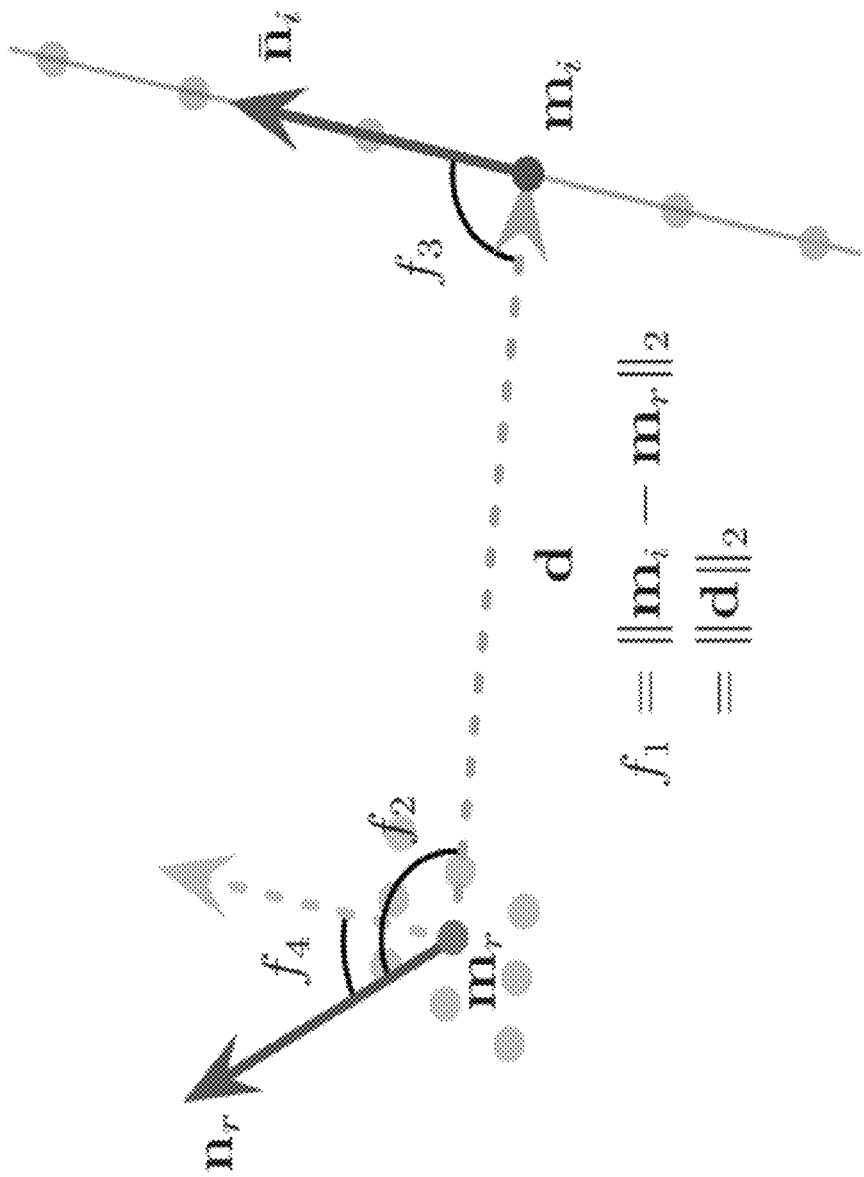
Figure 3D:
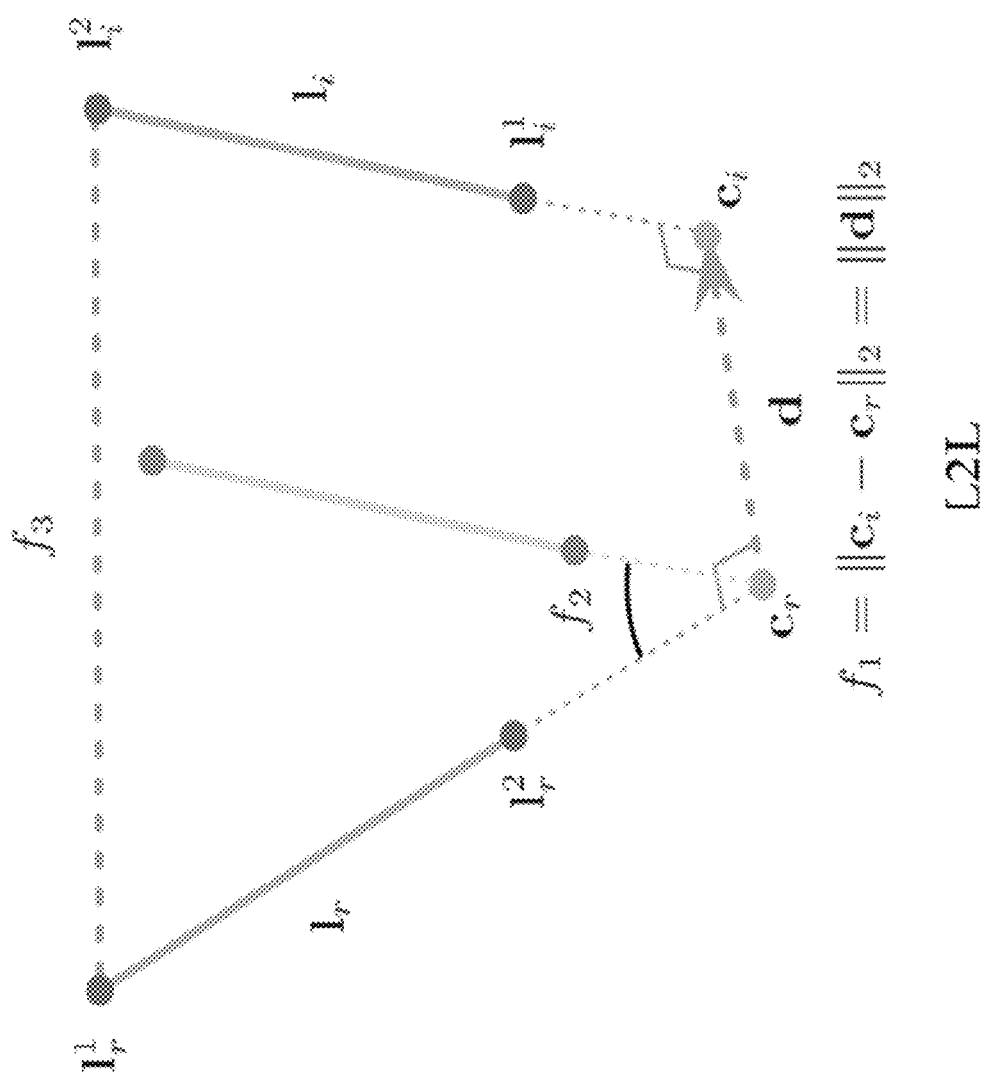

In FIG. 3B, the points show the boundary points on two 3D line segments. Then, the boundary pair feature descriptor $F_{B2B} \in \mathfrak{R}^4$ is defined by $$F_{B2B} = (f_1, f_2, f_3, f_4)^T \quad (3)$$

$$= (\|d\|_2, \angle(\bar{n}_r, d), \angle(\bar{n}_i, d), \angle(\bar{n}_r, \bar{n}_i))^T. \quad (4)$$

This feature is equivalent to $F_{S2S}$ except that $\bar{n}_r$ and $\bar{n}_i$ are directions of the 3D lines. Note that the directions are not uniquely determined. Therefore, we consider two possible directions $\bar{n}$ and $-\bar{n}$ when we use the B2B feature.

Object boundaries are highly informative. Compared to S2S, B2B provides more concise modeling because there are fewer boundary points compared to surface points. Additionally, the orientations from local line segments are more resilient to noise compared to surface normals.

S2B and B2S—Surface-Boundary Pair Feature:

Boundary pair features are associated with the depth edges of the object. Such a feature depending solely on boundary points may not be the best choice for an object with high surface curvatures. For example, any point on the surface of a spherical object can potentially become a depth edge based on the pose, whereas depth edges on a polyhedral object are more stable, and always appear on plane intersections.

To jointly and efficiently model both planar and curved objects, we provide a heterogenous pair feature defined using an oriented surface point and an oriented boundary point. By considering oriented points on the surface and the boundary, this feature reduces pose sampling compared to the B2B feature.

As shown in FIG. 2C, by selecting an oriented surface point as the reference point and an oriented boundary point as the referred point, the S2B feature descriptor $F_{S2B} \in \mathfrak{R}^4$ is defined by $$F_{S2B} = (f_1, f_2, f_3, f_4)^T \quad (5)$$

$$= (\|d\|_2, \angle(n_r, d), \angle(\bar{n}_i, d), \angle(n_r, \bar{n}_i))^T. \quad (6)$$

Similarly, the B2S feature is defined by selecting an oriented boundary point as the reference point and an oriented surface point as the referred point.

L2L—Line Pair Feature:

As shown in FIG. 3D, we also provide a pair feature L2L for 3D line segments. Constructing a feature for two line segments is slightly more involved than constructing one for oriented point pairs. In our method, we fit lines using the RANSAC procedure. The line segments are usually partitioned into several smaller segments due to noise, randomized line fitting, and occlusions. Therefore, the end points of line segments, denoted as $\{l_r^1, l_r^2, l_i^1, l_i^2\}$, cannot be determined reliably.

Thus, we consider two points denoted by $c_r$ and $c_i$ to define our feature descriptor. As shown in FIG. 2D, $c_r$ and $c_i$ are the closest points on each line with respect to each other. The acute angle between two line segments with directions $v_1$ and $v_2$ is:

$$\angle_a(v_1, v_2) = \begin{cases} \angle(v_1, v_2) & \text{if } \angle(v_1, v_2) \leq \frac{\pi}{2} \\ \pi - \angle(v_1, v_2) & \text{otherwise} \end{cases} \quad (7)$$

where $$\angle_a(v_1, v_2) \in \left[0; \frac{\pi}{2}\right].$$

Our L2L feature descriptor, $F_{L2L} \in \mathfrak{R}^3$, is $$F_{L2L} = (f_1, f_2, f_3)^T \quad (8)$$

$$= (\|d\|_2, \angle_a(l_r^2 - l_r^1, l_i^2 - l_i^1), f_3)^T. \quad (9)$$

where $$f_3 = \max(\|l_i^1 - l_r^1\|_2, \|l_i^1 - l_r^2\|_2, \|l_i^2 - l_r^1\|_2, \|l_i^2 - l_r^2\|_2).$$

The first component is the distance between the closest points $c_r$ and $c_i$ (i.e., the distance between the two infinite lines), and the second component is the acute angle between the two line segments. The last component represents the maximum distance between the two line segments. This maximum distance can be the maximum of all possible distances between an end point in one line segment with an end point in another line segment. This maximum distance is useful to prune false matches between two line segments having a similar distance and angle. For example, any pair of coplanar orthogonal lines has the same distance and angle. However, as described above, this maximum distance is not reliable due to the breaking of the line segments. Thus, we use a larger quantization step for this component in pose estimation. We do not construct the L2L feature for pairs of parallel line segments, because such pairs lead to ambiguity in pose.

The line pair feature provides very efficient matching because the number of line segments is less than the number of surface points or boundary points. This feature is particularly efficient for polyhedral objects and objects having long boundary line segments.

In a practical implementation, surface points are obtained by scanning and subsampling the depth image, 3D lines are determined via our RANSAC procedure that estimates 3D line segments from the 3D scan, and the boundary points are then obtained by subsampling along the line segments.

Object Representation

We first obtain geometric primitives $\mathcal{M}$: oriented surface points for S2S, oriented boundary points for B2B, both oriented surface and boundary points for S2B and B2S, and 3D line segments for L2L. These geometric primitives can be determined from either 3D scanned data with known calibration between the sensor and the object, or synthetic depth data rendered from a known CAD model.

With these primitives $\mathcal{M}$, we represent each particular object 140 using a set of model pair features 201 S2S, B2B, S2B, B2S, and L2L, as shown in FIG. 2A. For efficient feature matching, we store model pair features in a hash table $\mathcal{H}$ 205.

Initially, we discretize the feature pairs where the distances and the angles are quantized with step sizes of $\Delta_d$ and $\Delta_a$, respectively. It is important to define the quantization levels appropriately. Using large step sizes reduces discriminative power of the descriptors, whereas using small step sizes make the method sensitive to noise. Following, discretized pair feature descriptors are used as the key for the hash function and the pair features are inserted into bins accordingly. With appropriate quantization steps, similar pair features are grouped together and matching and voting can be done in constant time.

Constructing object representation can be a preprocessing step that can be performed off-line. FIG. 2A shows three different objects that could be randomly commingled in the bin for later picking.

In an on-line process, we determine scene pair features 202 from the scanned 3D point cloud 160, and match these features with the set of model pair features. The details of the method are shown in FIG. 2B.

Voting Scheme for S2S, B2B, S2B and B2S

Figure 2B:
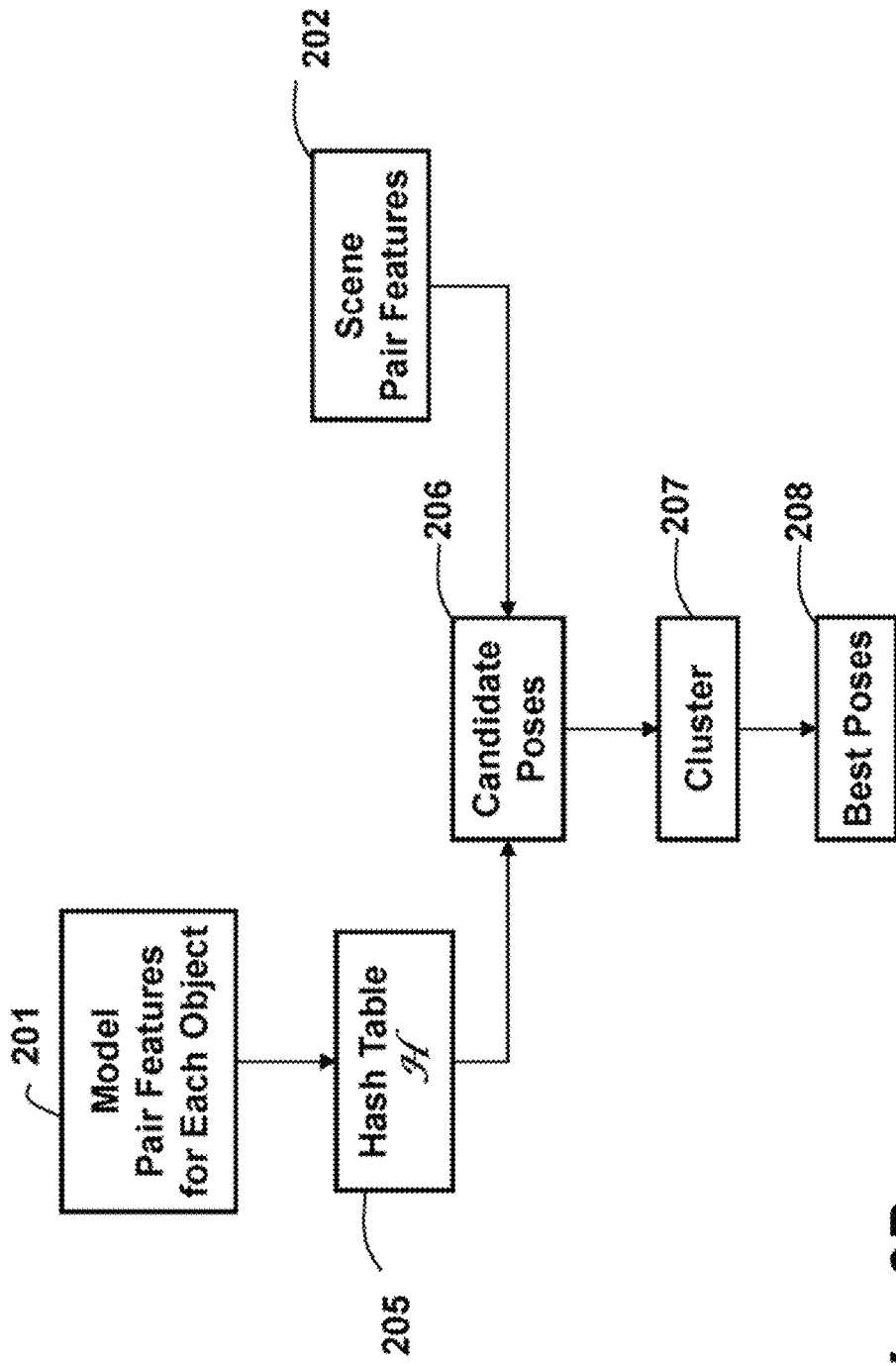
FIG. 2B is a block diagram of details of the method for determining a pose of a 3D object using a voting-based method.

As shown in FIG. 2B, after determining the pairs of features 202 from the model and constructing the hash table $\mathcal{H}$ 205, we determine the pose by calculating rigid body transformations between a scene pair feature and a set of corresponding model pair features. To make the process of finding the best poses efficient, we use a voting scheme. A naïve approach requires voting in 6-DoF pose space, which is inefficient.

Instead, we use a voting scheme, which reduces the voting space to a 2D space using intermediate coordinate transformations. First, a scene point pair $(s_r, s_i)$ is searched in the hash table $\mathcal{H}$, and then a corresponding model point pair $(m_r, m_i)$ is found. Then, reference points of the pairs are transformed to an intermediate coordinate system such that their positions correspond to the origin of the coordinate system and their normals are aligned with the x-axis. To fully align the pair, the referred points, $m_i$ and $s_i$, are aligned by rotating the object model around the x-axis with an angle $\alpha$.

The above transformation from $(m_r, m_i)$ to $(s_r, s_i)$ is parameterized by the pair of the reference model point and the planer rotation angle $(m_r, \alpha)$ and is given by $$s_i = T_{s \to g}^{-1} R_x(\alpha) T_{m \to g} m_i \tag{10}$$

where $R_x(\alpha)$ is the rotation around the x-axis with angle $\alpha$, $T_{s \to g}$ and $T_{m \to g}$ are the transformations from the scene coordinate system and model coordinate system to the intermediate coordinate system, respectively.

In voting phase, a reference point $s_r$ in the scene is paired with the other points $s_i$ in the scene, and then the model pair features $(M_r, m_i)$, which are similar to the scene pair feature $(s_r, s_i)$ are obtained from the hash table $\mathcal{H}$ based on their descriptors. For every pair, the rotation angle $\alpha$ is determined in the intermediate coordinate system and then votes are cast for the pair $(m_r, \alpha)$. After the voting, elements greater than a predetermined threshold are selected, from which candidate poses (rigid transformations between the model coordinates and the scene coordinates) 206 are computed as in Eqn. (10). This process is repeated by selecting different reference points in the scene. This voting scheme is applicable to S2S, B2B, S2B, and B2S pair features.

Voting Scheme for L2L

Figure 4:
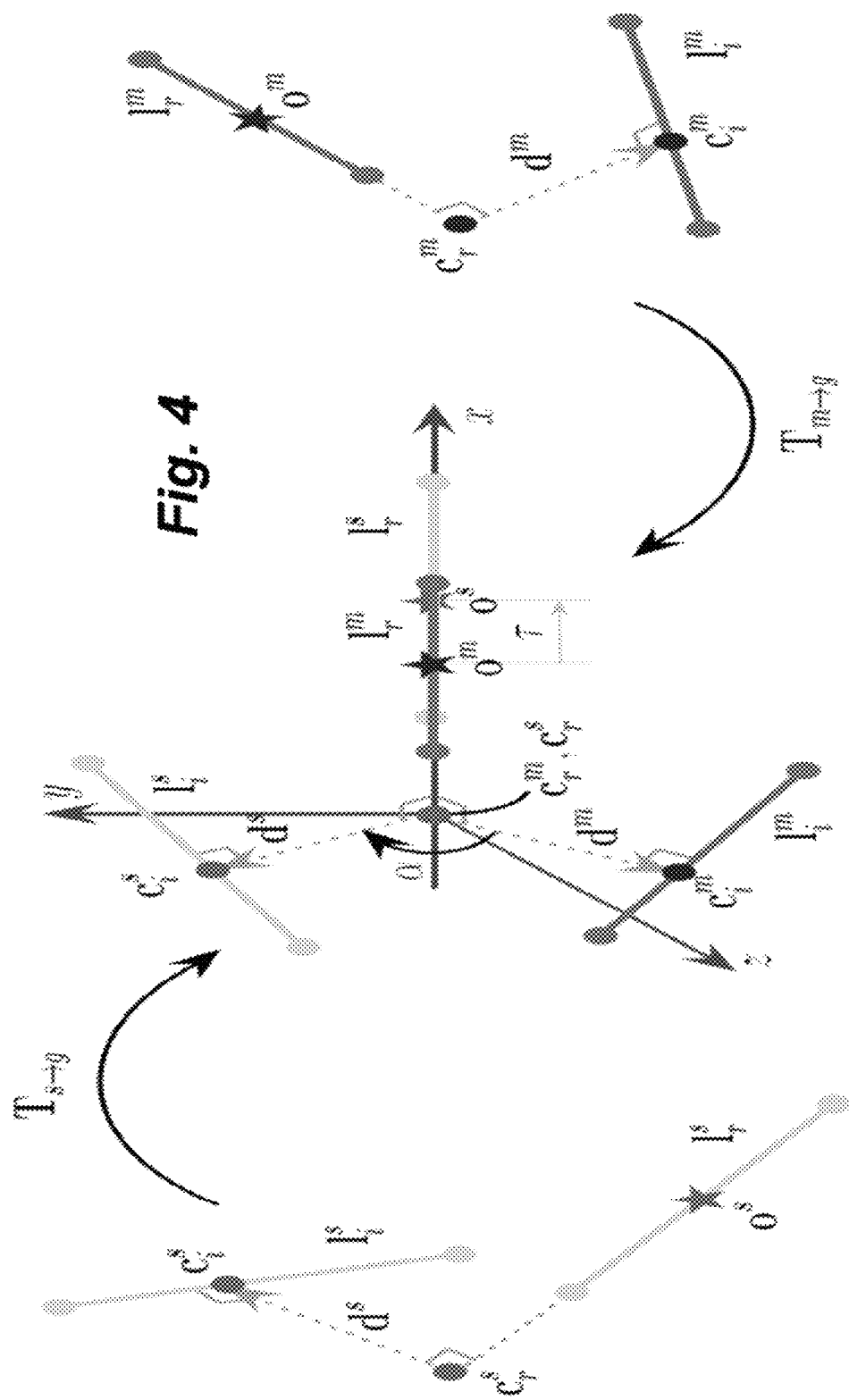
FIG. 4 is a schematic of a transform between a line pair feature obtained from the sensor data, and a line pair feature obtained from the model according to embodiments of the invention.

Because the L2L feature is defined by a pair of line segments, we use a different voting scheme for the L2L feature. Compared to the voting scheme for the point pair features, the voting scheme for the L2L feature is more difficult. However, the fundamental idea is the same: We align two pair features in an intermediate coordinate system, as shown in FIG. 4.

We first transform the line pairs to an intermediate coordinate system. By $T_{s \to g}$, the reference line from the scene $l^s_r$ is aligned to the x-axis, and the reference middle point $o^m$ is moved to the origin. The reference line from the model $l^m_r$ is similarly transformed by $T_{m \to g}$. After that, the closest point of the reference scene line $c^s_r$ and that of the reference model line $c^m_r$ are aligned at the origin by translating the reference lines along the x-axis. The difference between these translations is denoted as $\tau$. Then, the referred lines $l^s_i$ and $l^m_i$ are aligned by rotating the model with an angle $\alpha$ around x-axis. The angle $\alpha$ can be easily determined by $d^s$ and $d^m$.

Therefore, the transformation from $(l^m_r, l^m_i)$ to $(l^s_r, l^s_i)$ via the intermediate coordinate system for L2L voting scheme is parameterized by $(l^m_r, \alpha, \tau)$ and is given by $$l^s_i = T_{s \to g}^{-1} T_x(\tau) R_x(\alpha) T_{m \to g} l^m_i \tag{11}$$

where $T_x(\tau)$ is the translation along the x-axis.

Pose Clustering

In the voting scheme described above, the candidate poses 206 are obtained for each reference primitive (point or line) in the scene. Because the object is modeled by multiple feature pairs, it is expected to have multiple candidate poses over different reference primitives, points $m_r$ or lines $l^m_r$, supporting a consistent pose hypothesis. Thus, we aggregate similar poses from different scene primitives.

Although there are several methods for clustering in 3D rigid body transformation space SE(3), such as mean shift on Lie groups, those methods are usually computationally prohibitive for time-sensitive applications.

We use an agglomerative clustering 207 approach, which is very efficient. We first sort the candidate poses in decreasing order of the number of votes. From the candidate pose with the largest number of votes, we create a new cluster. If the next candidate pose is close to one of the existing clusters, then the candidate pose is added to the cluster and the cluster center is updated as the average of the candidate poses within the cluster. If the next candidate pose is not close to any of the clusters, then a new cluster is generated. The proximity testing is done with fixed thresholds for translation and rotation. Distance computation and averaging for translation are performed in the 3D Euclidean space, while those for rotation are performed using quaternion representation of rotation matrices.

After clustering, the clusters are sorted in decreasing order of the total number of votes, which determines confidence of the estimated poses. The clusters with the largest numbers of votes correspond to the best poses 208.

Effect of the Invention

A set of pair features, using oriented surface points, oriented boundary points, and boundary line segments, is provided to model a variety of objects. We use the pair features in a voting framework for accurate and efficient pose estimation.

Features from boundaries are more compact and informative, thereby leading to better accuracy and faster computation:

A bin-picking system implemented according to embodiments of the invention has a pickup success rate of higher than 98%, and pose estimation error less than 0.3 mm and 0.3° for translations and rotations.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for estimating a pose of an object, comprising the steps of: defining a set of pair features as pairs of geometric primitives defined in a 3D space invariant to the poses of the object, wherein the geometric primitives include oriented surface points, oriented boundary points, and boundary line segments; determining model pair features based on the set of pair features for a model of the object; determining scene pair features based on the set of pair features from data acquired by a 3D sensor; determining a descriptor from each pair feature, and matching the descriptors model pair features with the descriptors scene pair features; discretizing the descriptors for the pair features; storing the discretized descriptors of the model pair features; and performing the matching using a comparison algorithm, estimating candidate poses of the object based on voting via an intermediate coordinate transformation, wherein the steps are performed in a processor.

2. The method of claims 1, wherein the object is one of a plurality of different object randomly commingled with other objects, and there are model pair features for each object.

3. The method of claims 1, wherein the 3D sensor is mounted on a robotic arm, and the robotic arm includes a gripper to pick the object according to the pose.

4. The method of claims 1, wherein the 3D sensor uses structured light generated by an infrared laser.

5. The method of claim 1, wherein each pair feature is defined using two oriented surface points, two oriented boundary points, one oriented surface point and one oriented boundary point, and two boundary line segments.

6. The method of claim 1, wherein each oriented surface point comprises a 3D position on a surface of the object and a 3D normal vector.

7. The method of claim 1, wherein each oriented boundary point comprises a 3D position on a boundary of the object and a 3D direction vector.

8. The method of claim 7, wherein the 3D direction vector is defined as a direction tangent to the boundary at the 3D position.

9. The method of claim 1, wherein each boundary line segment is a line segment fitted to 3D points on a boundary of the object.

10. The method of claims 1, further comprising: storing the discretized descriptors of the model pair features in a hash table; and performing the matching using the hash table.

11. The method of claim 1, further comprising: clustering the candidate poses.

12. The method of claim 1, further comprising: refining the pose using an iterative-closest point procedure.

* * * * *